United States Patent [19]

Savovic et al.

[11] Patent Number: 5,260,146
[45] Date of Patent: Nov. 9, 1993

[54] CATHODICALLY PROTECTED BATTERY HAVING SACRIFICIAL ANODE

[75] Inventors: Niko M. Savovic, Sunrise; Venus D. Desai, Plantation; Adnan Aksoy, Boca Raton, all of Fla.

[73] Assignee: Motorola, Inc., Schaumburg, Ill.

[21] Appl. No.: 794,093

[22] Filed: Nov. 18, 1991

[51] Int. Cl.$^5$ ............................................. H01M 2/00
[52] U.S. Cl. .......................................... 429/65; 429/7; 429/48; 429/209
[58] Field of Search ........................ 429/7, 48, 65, 209

[56] References Cited

U.S. PATENT DOCUMENTS

| | | | |
|---|---|---|---|
| 3,607,442 | 9/1971 | Hall | 429/65 |
| 4,578,628 | 3/1986 | Siwiak | |
| 4,680,527 | 7/1987 | Benenati et al. | |
| 4,855,027 | 8/1989 | McCready | 204/196 |

Primary Examiner—Prince Willis, Jr.
Assistant Examiner—M. Nuzzolillo
Attorney, Agent, or Firm—Dale W. Dorinski

[57] ABSTRACT

A cathodically protected battery comprising a battery cell (110) having positive (160) and negative (140) electrical terminals. A sacrificial anode (150) is electrically coupled to the battery cell and situated on an external surface (120) of the battery cell. The sacrificial anode is strategically located so as to be exposed to the corrosive environment, thereby negating the corrosion of the battery electrical terminals. A plurality of cells is also configured to form a cathodically protected multicell battery package for use in a corrosive environment. The multicell battery (200) comprises a battery housing (210) and a plurality of cells (250–300) within the housing. The cells are electrically coupled together so as to terminate in a positive and a negative terminal. Electrical contacts (221 and 222) are provided on the exterior (220) of the battery housing and the positive and negative terminals of the cells are connected to these contacts. A sacrificial anode (231) is electrically connected to the cells so as to expose the sacrificial anode to the environment.

13 Claims, 4 Drawing Sheets

CATHODICALLY PROTECTED BATTERY HAVING SACRIFICIAL ANODE

TECHNICAL FIELD

This invention relates generally to a battery for energizing electrical and electronic equipment and more particularly to batteries that are cathodically protected against corrosion from the environment.

BACKGROUND

Corrosion is the destructive attack of a metal by chemical or electrochemical reaction with its environment. In some instances, chemical attack accompanies physical deterioration and results in corrosive wear. Corrosion in electrical or electronic devices is particularly harmful since these types of devices are very susceptible to performance deterioration when any of the electrical components erode. Corrosion prevention stems from economic, safety, and conservation concerns. With respect to electronic products, economics and safety are the prime factors in motivating corrosion prevention research.

Battery powered electrical devices typically have electrical contacts where a replaceable battery may be connected to the device. Likewise, the battery intended for attachment to and for energizing the electrical equipment necessarily must have battery terminals which are intended to mate with the corresponding terminals of the electrical equipment. These contacts or terminals of the battery and the electrical equipment are exposed when the battery or battery pack is separated from the equipment portion which it powers and also when the battery or battery pack is connected to the electrical equipment. When the battery powered electrical equipment is used in a corrosive environment, such as that experienced near coastlines, electrochemical corrosion of the battery terminals results.

There have been attempts in the past to resolve this problem. One of these attempts involves environmentally sealing or isolating the electrical contacts of the battery and the electrical device from the corrosive environment. This provides a solution only while the battery is connected to the electrical device, leaving the problem of corrosion during the time when the battery is removed from the device. Also, any violation of the integrity of the environmental seal will result in corrosion of the battery terminals.

Another attempt to solve this problem has been to use noble metals as the contact surfaces of the battery terminals and the electrical device supply terminals. Plating the contacts with material such as gold, platinum or silver does retard corrosion in marine environments, however, this is an expensive solution to the problem and the noble metal plating eventually wears away, thereby exposing the underlying metal to possible corrosion.

What is needed then, is a method of eliminating the corrosion of battery terminals in marine environments that does not require expensive noble metal plating or complicated environmental sealing mechanisms.

SUMMARY OF THE INVENTION

Briefly, according to the invention, there is provided a cathodically protected battery comprising a battery cell having positive and negative electrical terminals. A sacrificial anode is electrically coupled to the battery cell and situated on an external surface of the battery cell. The sacrificial anode is strategically located so as to be exposed to the corrosive environment, thereby reducing or partially negating the corrosion of the battery electrical terminals.

In an alternate embodiment of the invention, a cathodically protected multicell battery package is created for use in a corrosive environment. The multicell battery comprises a battery housing and a plurality of cells within the housing. The cells are electrically coupled together so as to terminate in a positive and a negative terminal. Electrical contacts are provided on the exterior of the battery housing and the positive and negative terminals of the cells are connected to these contacts. A sacrificial anode is electrically connected to the cells so as to expose the sacrificial anode to the environment.

In another embodiment of the invention, a battery-powered electrical device is provided with cathodic protection. The electrical device is contained within a housing along with a battery power source. A sacrificial anode is electrically coupled to the battery power source and situated so as to expose the anode to the corrosive environment.

In still another embodiment of the invention, a battery-powered communications device is provided for use in a corrosive environment comprising a communications device and a battery package. The battery package contains a plurality of cells and electrical contacts, and a sacrificial anode situated so as to expose the anode to the environment. The communications device and the battery package are configured to detachably interconnect the communication device from the battery package by means of sets of battery contacts and power supply terminals.

DETAILED DESCRIPTION OF THE PREFERRED EMBODIMENT

Corrosion processes are most often electrochemical. Metal surfaces are prone to a phenomenon called local action current, where impurities in the metal surface serve to form a portion of a galvanic cell. So long as the metal remains dry, local action current and corrosion are not observed, but on exposure of the metal to aqueous solutions, the local action current causes chemical conversion of the metal to corrosion products. This phenomenon accounts for the corrosion of metals exposed to water, salt solutions, acids, or alkalis.

Figure 1:
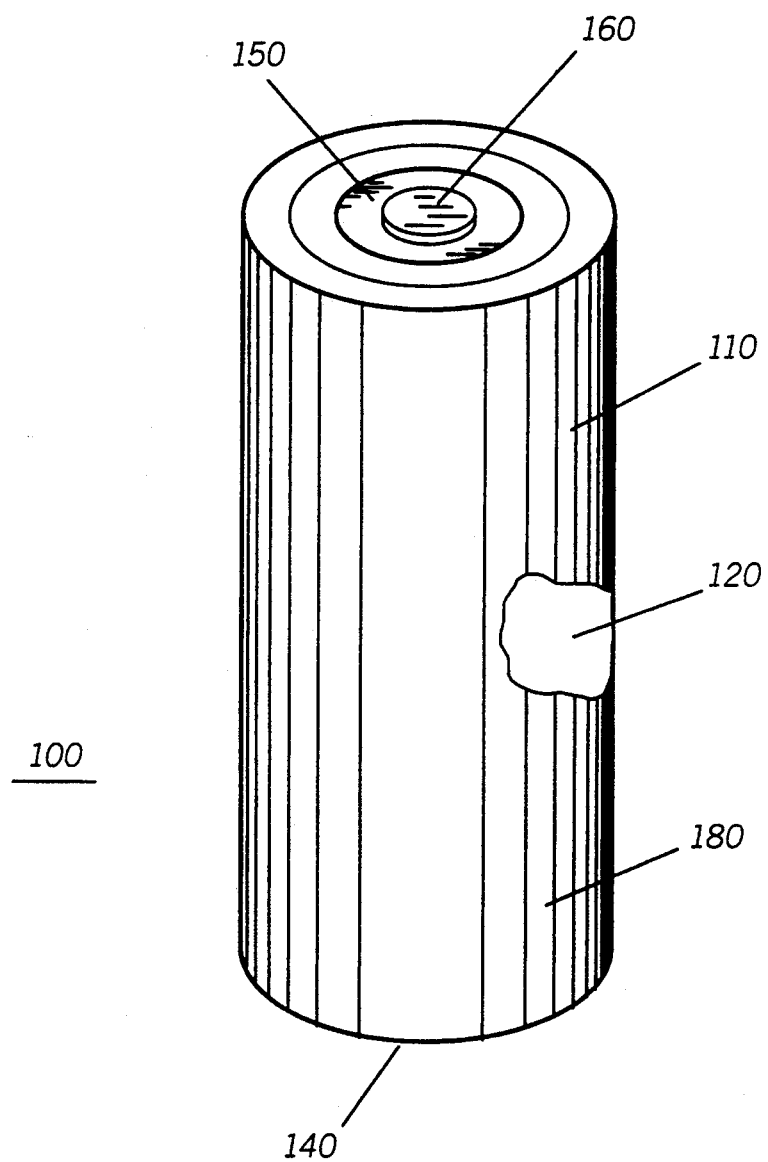
FIG. 1 is an isometric view of a battery cell in accordance with the invention.

Referring now FIG. 1, a cathodically protected battery 100 is formed from a battery cell 110. The battery cell has a metal housing 120, which serves as the ground terminal of the battery cell. The composition and manufacture of battery cells are well known to those skilled in the art. In addition to a negative electrode 140, typically on the bottom of the battery cell housing 120, a positive electrode 160 is on the top of the battery cell 110. A sacrificial anode 150 is situated on the exterior of the battery housing 120 and electrically connected to the positive terminal 160 of the battery. Since most cell constructions form the positive electrode 160 out of the lid for the cell housing, the sacrificial anode may be readily connected to the positive terminal simply by connecting it to the metal lid. Typically, an insulating material 180, such as a plastic film, is applied over the battery housing 120 in order to prevent accidental connection of the negative housing portion with other areas of circuitry. The dielectric film 180 has an opening in the film in order to expose the anode 150 to the environment.

Both the positive and negative battery terminals are susceptible to corrosion when used in certain environments or atmospheres. One method of reducing the corrosion of metals immersed in liquid environments is to cathodically protect them. Cathodic protection has been used to prevent corrosion of metals immersed in water or buried underground, such as on ocean-going vessels or underground vessels, wires and pipes. Cathodic protection requires a source of direct current and an auxiliary electrode or electrode or anode, usually of iron or graphite, located some distance away from the structure intended to be protected. The direct current source is applied with the positive terminal connected to the auxiliary electrode, causing the corrosion reaction to be halted or reversed. One specific corrosion protection scheme is to employ an auxiliary anode composed of a metal more active in the galvanic series than the metal to be protected, thereby setting up a galvanic cell with the current direction as previously described. If the impressed source of current is omitted, the electrode is called a sacrificial anode.

The sacrificial anode 150 is not directly connected to the negative terminal 140 by means of a liquid electrical connection as is normally practiced. In the instant invention, cathodic protection is uniquely provided by means of vapors of moist air in the cell operating environment. The moist air, while not as good a conductor as the aqueous solution, still serves to provide a small amount of connection between the sacrificial anode 150 and the battery contact 140. In coastal areas, where the moist air is also composed of salt from sea water, a more efficient cell is set up. Sacrificial metals that may be used for the anode in order to provide cathodic protection to the battery are typically magnesium or magnesium based alloys and, to a lesser extent, zinc and aluminum. Other materials, such as cadmium, copper, graphite, iron, lead, platinum, silver, steel, tin, titanium, and various alloys thereof, have also been used as sacrificial anodes and may be employed in the present invention. The main criterion for selection of a sacrificial anode material is that it be more electronegative than the contact material. Other appropriate alloys or materials may be selected from the electrochemical series.

Figure 2:
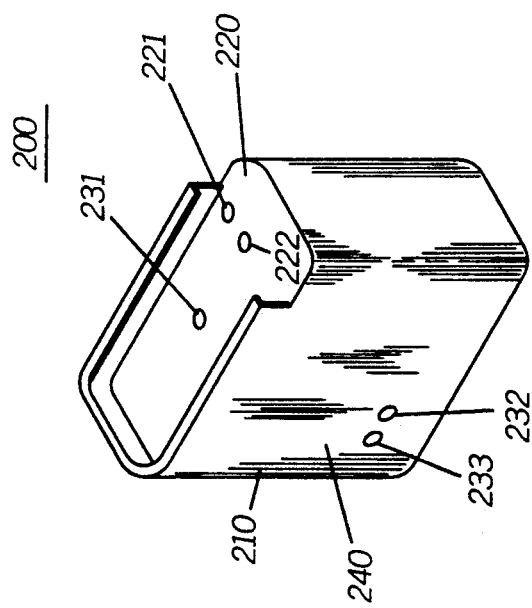
FIG. 2 is an isometric view of a multicell battery package in accordance with the invention.

Turning now to FIG. 2, a perspective view of one embodiment of the battery of the present invention is shown as battery 200. Battery 200 includes a housing 210 made of a material having a substantial structural integrity, such as polycarbonate, for example, which is sufficiently durable to protect the battery cells which are housed therein. Battery housing 210 includes an external surface 220 on which electrical contacts 221 and 222 are situated. The battery cells (not shown) housed within the housing 210 are connected together in such a manner so as to connect the batteries either in series, or in parallel, or in some combination of series and parallel, and so as to terminate in a positive and a negative terminal. Other electrical components, such as resistors, capacitors, thermistors, thermal switches, diodes, and so forth, may also be found within the battery housing and connected to the plurality of cells. The positive and negative terminals (not shown) are connected to battery contacts 221 and 222. A sacrificial anode 231 is strategically located near the electrical contacts 221 and 222 and electrically coupled to the positive contact 222. It is also situated so as to expose the sacrificial anode 231 to the environment. The sacrificial anode 231 may be mounted to the external surface 220 of the housing 210 or it may be located within the housing 210 and exposed to the exterior environment by means of an opening or port. Battery 200 also includes battery charger contacts 232 and 233 which are employed to interface the battery 200 to a battery charger (not shown). Battery charger contacts 232 and 233 are also connected to the plurality of cells contained within the housing, and may also be protected by the same anode or an additional sacrificial anode. The second anode (if used) would be strategically located near the contacts 232 and 233.

Figure 3:
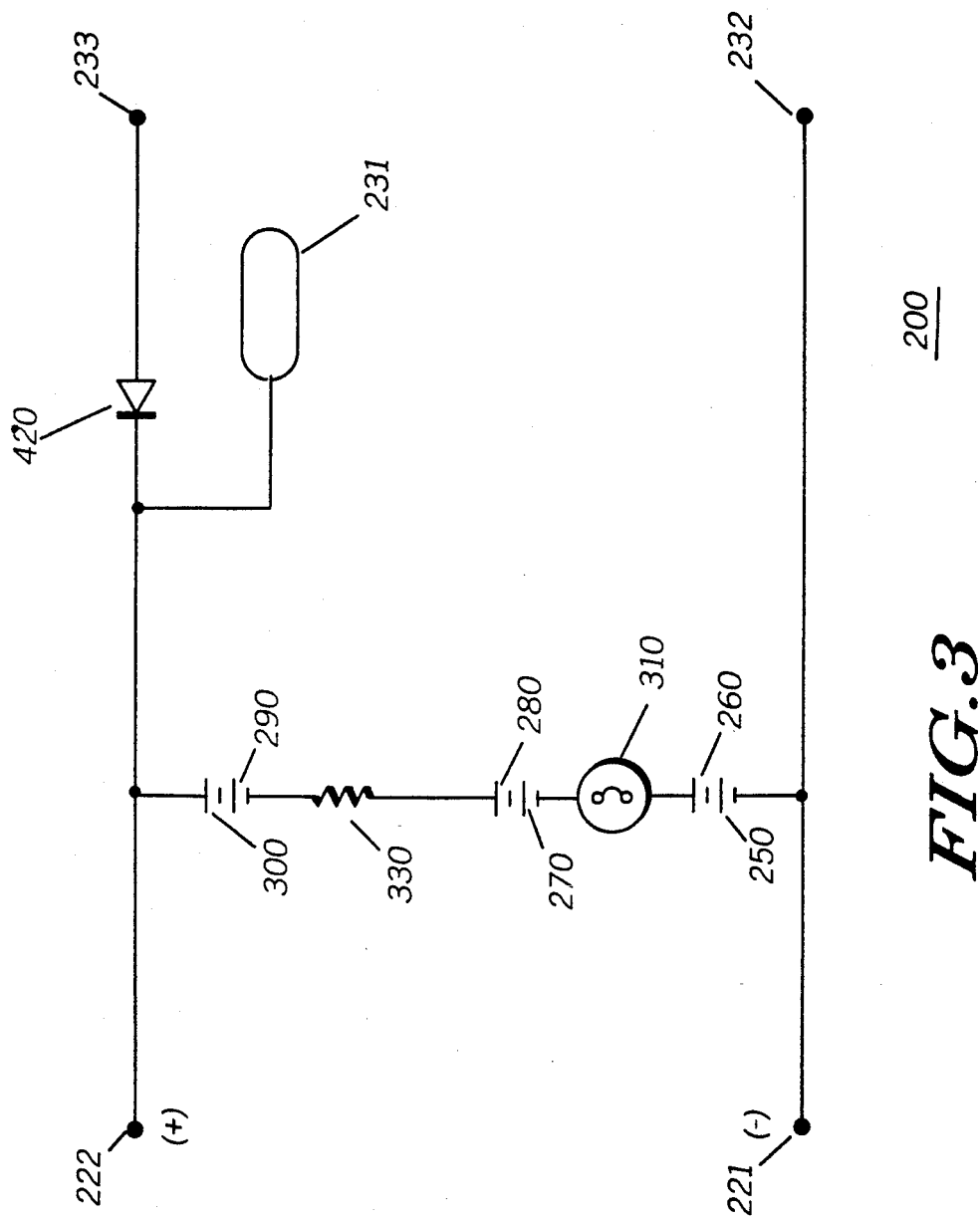
FIG. 3 is an electrical schematic of a battery circuit in accordance with the invention.

In the embodiment shown in FIG. 3, battery 200 includes six battery cells, 250, 260, 270, 280, 290 and 300, which are coupled together in series relationships as shown. Other electrical circuit elements, such as thermostat 310 and resistor 330, are interspersed amongst cells 250 to 300. Each of cells 250 to 300 includes a positive and a negative terminal. The negative terminal at one end of the series chain of cells 250 to 300, namely the negative terminal of cell 250, is coupled to power contact 221. The positive terminal at the remaining end of the series chain of cells 250 to 300, namely the positive terminal of cells 300, is coupled to the power contact 222. In this manner, the series combined voltage of cells 250 to 300 provides power to contacts 221 and 222. In this example, each of cells 250 to 300 is rechargeable nickel cadmium cell with a voltage of 1.25 volts. Thus, a total of 7.5 volts is generated across power contacts 221 and 222. Battery 200 also includes a diode 420 and charger contacts 232 and 233. The sacrificial anode 231 is also electrically connected to the series of cells 250 to 300. The sacrificial anode 231 is typically mounted on the external surface 220 of the housing 210 in order to provide maximum exposure to the corrosive environment. However, sacrificial anode 231 may be mounted internally to the housing 210 as long as an opening is provided in order to expose the anode 231 to the environment. If the sacrificial anode 231 is mounted on the external surface of the housing 210, a label or other cover may also be placed over the anode 231 in order to provide a more pleasing cosmetic appearance. Again, it should be noted that any covering or label over the anode 231 must be affixed in a manner so as to substantially expose the anode or portions of the anode to the environment. This may be accomplished by means of a channel under the label to the anode or a by using a perforated, porous, or breathable label.

Figure 4:
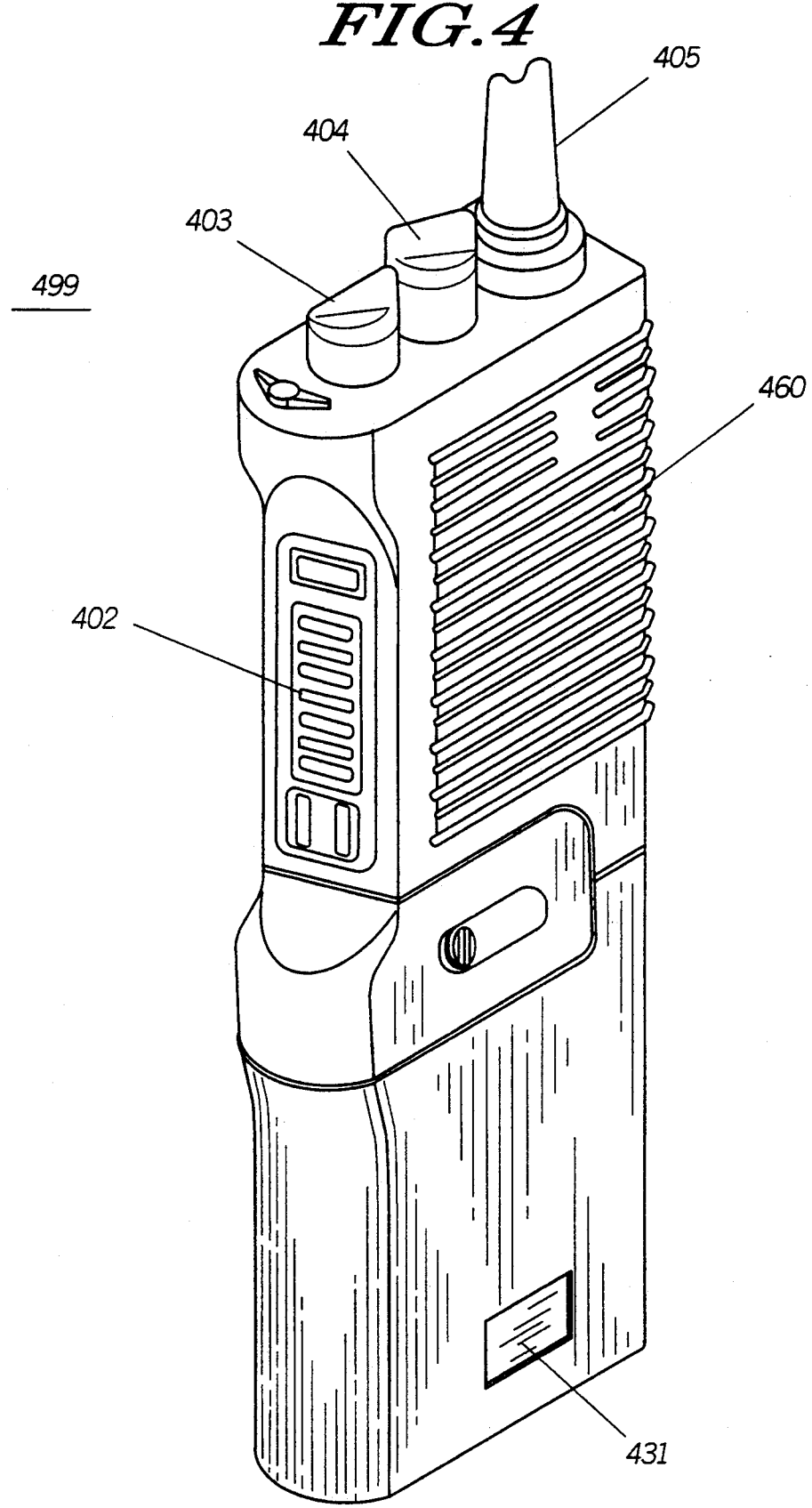
FIG. 4 is an isometric view of a communications device in accordance with the invention.

Referring now to FIG. 4, a typically battery powered communications device is provided, in this case, a two-way portable radio transceiver 499 which has been constructed in accordance with one embodiment of the present invention. The radio 499 includes all the necessary controls, such as push-to-talk switch 402, volume control 403, squelch control 404, antenna 405 and the like, well understood by those skilled in the art. Radio 499 further includes a first radio housing portion 460 which contains all of the operating electrical and electronic circuitry and a suitable battery power source (not shown). The radio 499 also contains a sacrificial anode 431 electrically coupled to the battery power source.

Figure 5:
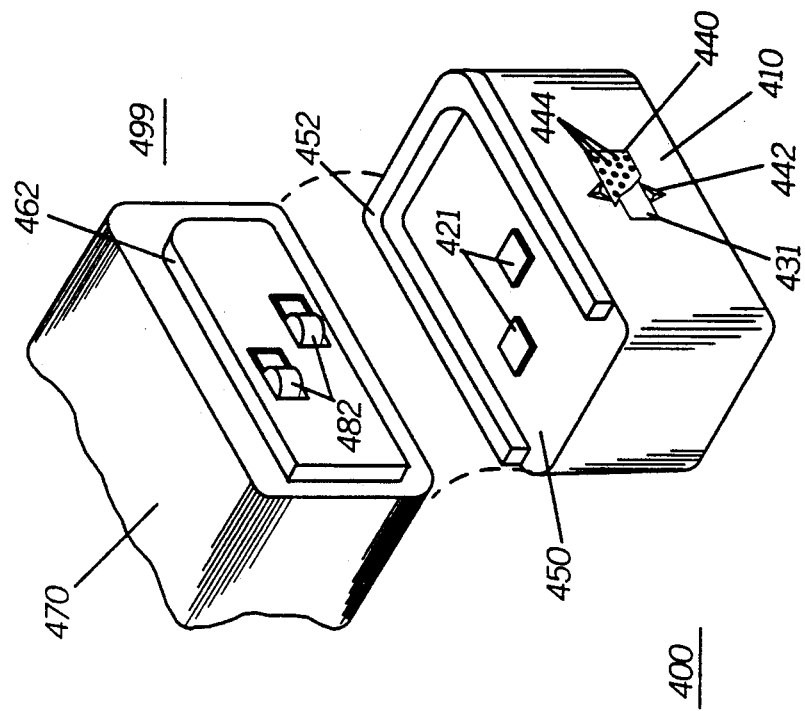
FIG. 5 is an isometric view of a battery power source and an electrical device in accordance with the invention.

Referring now to FIG. 5, a battery power source 400 includes a second housing portion 410 and a plurality of electrical cells coupled together and situated within the housing 410. The plurality of cells are ultimately connected to battery electrical contacts 421. A sacrificial anode 431 is positioned strategically on the housing 410 and electrically connected to the plurality of cells. The sacrificial anode is covered with a label or other type of cover 440 so as to expose the anode 431 to the corrosive environment that the radio is to be operated within. This is accomplished by means of channels 442 formed in the housing underneath the label or cover 440 to expose the anode 431 to the moist or corrosive air in the environment. Exposure may also be accomplished by placing small openings or porosities in the label itself. The radio 499 and the battery package 400 are configured to allow interconnection of the two. In order to accomplish this, the forward section 462 on the bottom portion of housing 470, which is of a reduced configuration, is slipped into the opening 450 formed in the rear of ledge 452 positioned on the top of housing 410. Battery terminals 421 thus become mated to radio supply terminals 482 and operating power is thereby supplied to the radio circuitry in the housing portion 470. This configuration is but one of many that have been used and may be further envisioned to allow a radio and a battery package or other electrical apparatus to be detachably interconnected in order to provide electrical contact between the supply terminals and the electrical contacts of the battery.

While only certain preferred features of the invention have been shown by way of illustration, many modifications and changes will occur to those skilled in the art. It is, therefore, to be understood that the present claims are to cover all such modifications and changes which may fall within the breadth and scope of the invention.

What is claimed is:

1. A cathodically protected multicell battery adapted for use in a corrosive environment, comprising:
    a battery housing having an external surface;
    a plurality of cells electrically coupled together and situated in said housing and including at least a positive and a negative terminal at opposed ends of said plurality of cells;
    electrical contacts situated on the external surface of said battery housing and coupled to said positive and negative terminals; and
    at least one sacrificial electrode electrically coupled to the plurality of cells, said at least one sacrificial electrode exposed to the environment and remotely located from the electrical contacts.

2. The cathodically protected multicell battery of claim 1, further comprising a cover affixed over the sacrificial electrode.

3. The cathodically protected multicell battery of claim 1, wherein the sacrificial electrode is selected from the group consisting of aluminum, cadmium, graphite, iron, lead, magnesium, silver, steel, tin, titanium, zinc, and alloys thereof.

4. The cathodically protected multicell battery of claim 1, wherein the sacrificial electrode is located on the external surface of the housing.

5. A cathodically-protected battery-powered electrical device for use in corrosive environments, comprising:
    a first housing having the electrical device therein;
    a battery power source situated in said housing and including at least a positive and a negative terminal electrically coupled to the electrical device; and
    at least one sacrificial electrode electrically coupled to said battery power source, said sacrificial electrode exposed to the corrosive environment and not physically connected to the positive or negative electrical terminals.

6. The cathodically-protected battery powered electrical device of claim 5, wherein the sacrificial electrode is selected from the group consisting of aluminum, cadmium, graphite, iron, lead, magnesium, silver, steel, tin, titanium, zinc, and alloys thereof.

7. The cathodically-protected battery powered electrical device of claim 5, wherein the sacrificial electrode is located on an external surface of the first housing.

8. The cathodically-protected battery powered electrical device of claim 5, further comprising a cover affixed over the sacrifical electrode.

9. The cathodically-protected battery powered electrical device of claim 5, wherein the battery power source is situated in a second housing having a set of terminals electrically coupled to said battery power source, said first and second housings having means for detachably interconnecting the electrical device and the battery power source by means of the set of terminals.

10. The cathodically-protected battery powered electrical device of claim 9, wherein the battery power source comprises a plurality of cells electrically coupled together and situated in said second housing, and including positive and negative terminals connecting said plurality of cells to said set of terminals.

11. The cathodically-protected battery powered electrical device of claim 10, wherein the first housing comprises a portable radio transceiver.

12. The cathodically-protected battery powered electrical device of claim 9, wherein the sacrificial electrode is situated on an exterior surface of the second housing.

13. A battery powered communications device, comprising:
    a communications device having a set of electrical supply terminals, a first housing and electrically energized circuitry therein, operating power for the device supplied through the set of included supply terminals;
    a battery package comprising:
        a battery housing having an external surface;
        a plurality of cells electrically coupled together and situated in said battery housing and including at least a positive and a negative terminal at opposed ends of said plurality of cells;
        electrical contacts situated on the external surface of said battery housing and coupled to said positive and negative terminals;
        a sacrificial electrode electrically coupled to the plurality of cells, said sacrificial electrode situated on the external surface of said battery housing remote from the electrical contacts and selected from the group consisting of aluminum, cadmium, graphite, iron, lead, magnesium, silver, steel, tin, titanium, zinc, and alloys thereof; and
        a cover affixed over the sacrificial electrode; and
    said communications device and said battery package having means for detachably interconnecting the set of included supply terminals and the electrical contacts.

* * * * *